United States Patent [19]

Pelissier

[11] Patent Number: 5,033,927

[45] Date of Patent: Jul. 23, 1991

[54] DEVICE FOR CARRYING OUT SEQUENTIAL THERMAL TREATMENTS UNDER A VACUUM

[75] Inventor: Laurent Pelissier, Grenoble, France

[73] Assignee: Etudes Et Constructions Mechaniques, Seyssinet, France

[21] Appl. No.: 494,374

[22] Filed: Mar. 16, 1990

[30] Foreign Application Priority Data

Mar. 17, 1989 [FR] France .............................. 89/03794

[51] Int. Cl.[5] .............................................. B65G 65/00

[52] U.S. Cl. .................................... 414/217; 148/16.6

[58] Field of Search ............... 414/217, 223, 152, 158, 414/172, 173; 266/251, 252; 148/19, 16.5, 16.6

[56] References Cited

U.S. PATENT DOCUMENTS

| | | | |
|---|---|---|---|
| 1,610,809 | 12/1926 | Newman | 266/252 X |
| 2,042,521 | 6/1936 | Ford, Jr. | 266/251 X |
| 3,652,444 | 2/1972 | Lester et al. | 414/217 X |
| 3,778,221 | 12/1973 | Bloom | 266/252 X |
| 4,781,511 | 11/1988 | Harada et al. | 414/217 |
| 4,815,912 | 3/1989 | Maney et al. | 414/217 |
| 4,938,858 | 7/1990 | Zejda | 414/217 X |

FOREIGN PATENT DOCUMENTS

| | | | |
|---|---|---|---|
| 1533954 | 4/1967 | Fed. Rep. of Germany . | |
| 2106656 | 9/1970 | France . | |
| 2426877 | 5/1978 | France . | |
| 2537260 | 12/1982 | France . | |
| 8704414 | 7/1987 | World Int. Prop. O. | 414/217 |

OTHER PUBLICATIONS

Neuzeitliche Vakuumanlagen fur Warmebehandlung und Loten, 2326 HTM Harterei-Technische Mitteilungen, vol. 35 (1980), No. 5, Munchen, Deutschland, pp. 245-250.

New Products, 1081 Metal Progress, 126 (1984), Spet., No. 4, Metals Park, Ohio, USA, Sep. 1984, p. 97.

*Primary Examiner*—David A. Bucci

*Attorney, Agent, or Firm*—Lowe, Price, Leblanc and Becker

[57] ABSTRACT

A device for treating parts in a controlled atmosphere comprises an airtight chamber (2), treatment cells (31) mounted on the airtight chamber and able to communicate with the airtight chamber for allowing the part to be transferred from the treatment cell to the airtight chamber, a loading-unloading cell (15) including an element (19) for gripping the part and keeping it suspended in the loading-unloading cell, and at least one device (21) for transferring the part from one cell to another through the airtight chamber (2).

10 Claims, 4 Drawing Sheets

DEVICE FOR CARRYING OUT SEQUENTIAL THERMAL TREATMENTS UNDER A VACUUM

FIELD OF THE INVENTION

The present invention generally relates to thermal treatment of parts is a controlled atmosphere.

Numerous part treatments require a controlled atmosphere. By way of example, cementation of metal parts is generally carried out by heating at high temperature parts immersed in a suitable gas under very low pressure. Also, some hardening of metal parts is also obtained by placing those parts in a flow of inert gas under high pressure. On the other hand, it is sometimes compulsory to sequentially carry out several treatment steps under a controlled atmosphere while avoiding exposure of the parts to ambient air between two successive steps.

For example, in the case of cementation of metal parts followed by a hardening process, the parts can be brought into a first cell in which cementation is carried out, then transferred into another cell in which hardening is performed. During the transfer, it is then necessary to avoid contact with ambient air by maintaining the parts under a vacuum.

Document 2326 HTM Märterei-Technische Mitteilungen, vol. 36 (1980) No. 5, Munich, DE, pages 245–250 describes a facility permitting successive part treatments under controlled atmosphere.

This document describes a facility comprising several cells arranged according to a circle, each having a downward aperture and comprising a revolving table capable of moving upwards and downwards and having a number of part positions equal to the number of cells. In the upward position, this table carries all the parts into the various cells and simultaneously seals those cells. When treatment is completed in each of the cells, the table is lowered and rotated so as to allow the parts to successively enter each cell. One of those cells serves as a location to load and unload the parts.

This type of facility has numerous drawbacks.

First, if the parts to be treated are very heavy and if there is a large number of treatment cells, for example 6, the size of the table has to be designed so as to be capable of withstanding an equal number of parts to be treated and causing those parts to rotate and to be raised. In that case, the facility is effectively very large and expensive.

On the other hand, if a same facility provides for a treatment cell operating at a very low pressure and another cell operating at a high pressure, it is difficult or impossible, to have each of those cells properly closed solely by the effect of raising the table.

Also, the parts have to remain during the same time duration in each cell, this time duration corresponding to the longest treatment time. This causes some of the cells to be under-employed. This underemployment is relatively high for some applications, for example, in the case of cementation, the time duration of which generally ranges from fifteen to sixty minutes, and of a hardening process, the time duration of which generally ranges from five to fifteen minutes.

The present invention overcomes the above drawbacks.

SUMMARY OF THE DISCLOSURE

The invention therefore relates to a device for treating parts under a controlled atmosphere comprising an airtight chamber and at least one treatment cell fixed on the airtight chamber and able to communicate with the airtight chamber for allowing the part to be transferred from the treatment cell to the airtight chamber: at least one cell for loading and unloading a part, with an aperture for allowing the part to be introduced or extracted, each cell comprising gripping means to keep the part suspended in this loading-unloading or treatment cell; means for handling the loading-unloading cell to move it from a remote position, in order to load or unload the part, to a coupling position on the airtight chamber in front of the aperture of the loading-unloading cell, to allow the part to be transferred from the cell to the airtight chamber; at least one means, arranged inside the airtight chamber, for handling the part and allowing it to be transferred from the loading-unloading cell to the treatment cell, the part transiting through the airtight chamber.

In an embodiment of the invention, each treatment cell has its aperture downwardly directed and is fixed on the upper wall of the airtight chamber in front of a passageway arranged in this upper wall.

In another embodiment of the invention, at least one of the treatment cells is designed to carry out a thermal treatment under low pressure and communicates with the airtight chamber during treatment.

BRIEF DISCLOSURE OF THE DRAWINGS

The foregoing and other objects, features and advantages of the invention will be apparent from the following detailed description of a preferred embodiment as illustrated in the accompanying drawings, wherein.

DESCRIPTION OF A PREFERRED EMBODIMENT

Figure 1:
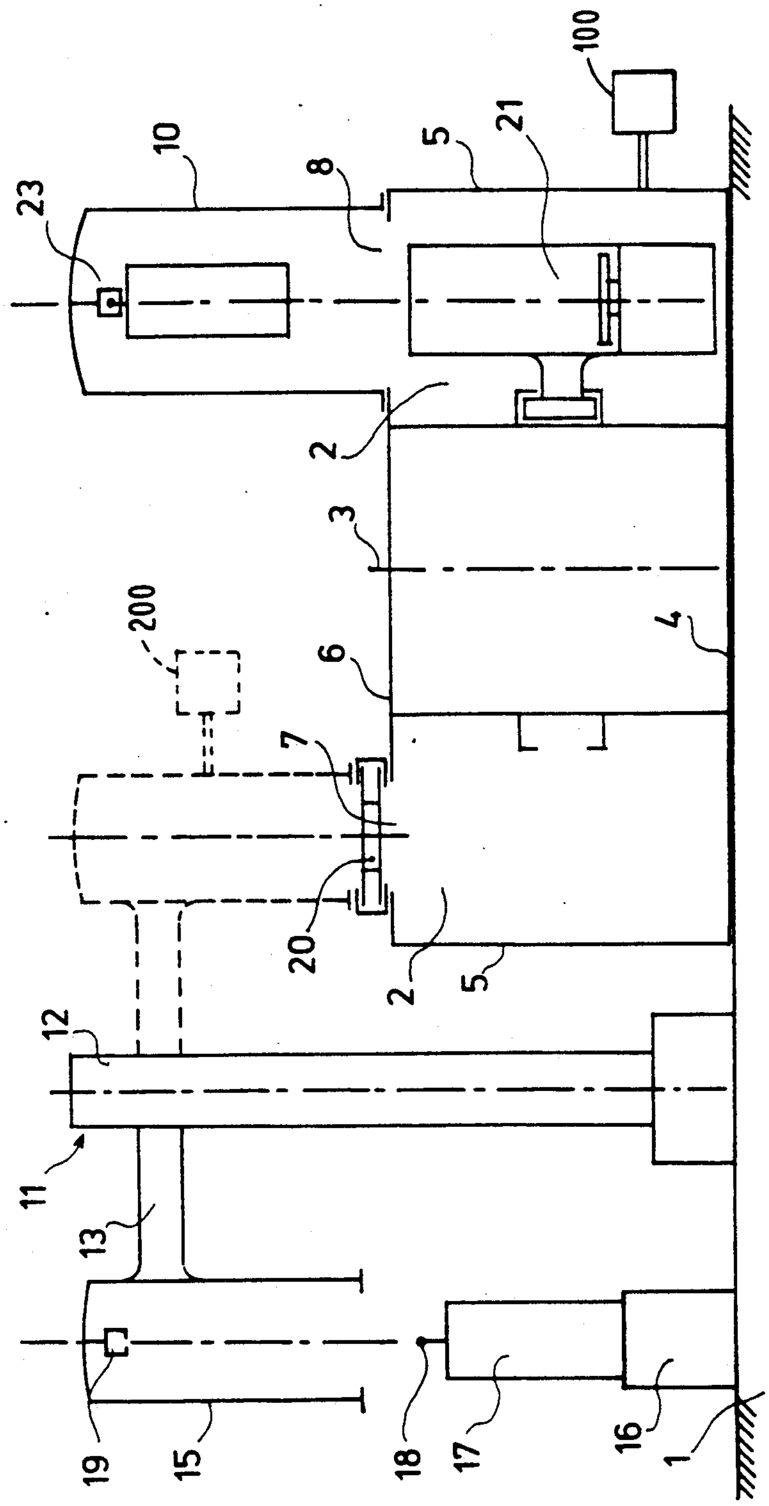
FIG. 1 is a schematic partial section view of the device of the invention.

FIG. 1 represents the main elements of a device according to the invention. On a floor 1, generally horizontal, is placed a cylindrical airtight chamber 2 having a vertical axis 3. The airtight chamber 2 comprises a bottom 4, a cylindrical lateral wall 5 and an upper plane horizontal wall 6. The upper wall 6 has several apertures, which 7 and 8 only are visible in FIG. 1. Each thermal treatment is carried out in a specific cell. In FIG. 1, only one treatment cell 10 is shown. This cell 10 has the general shape of a cylinder closed at its upper side and open at its lower side. Cell 10 is coupled to airtight chamber 2 at aperture 8, so that it communicates with the inner portion of airtight chamber 2. Cell 10 is airtight as well as is its mounting with the upper wall 6 of airtight chamber 2.

The device according to the invention also includes a T-support 11 essentially comprising a column 12 capable of pivoting around a vertical axis, and an arm 13 rotating with the column and bearing at its extremity a cell 15 designed to load and unload the parts to be treated. The loading-unloading cell 15, like the treatment cells 10, bas a cylindrical shape and is downwardly open.

On a base 16 laid upon floor 1 is arranged a part 17 to be subjected to one or several treatments by the inventive device.

The part to be treated 17, in fact, generally is a set of parts arranged in a basket. Hereinunder, the word "part" is to be construed as designating the basket loaded with the parts to be treated.

Part 17 is provided at its upper portion with a projection 18. When it is desired to treat a part 17, this part is laid upon base 18. T-support 11 is operated so that the loading-unloading cell 15 is positioned above part 17 and is then lowered on the latter. A gripping means 19 is arranged inside cell 15 in its upper portion and hooks the projection 18 so that part 17 is suspended inside cell 15. Once part 17 is suspended inside cell 15, the T-support 11 is rotated in order to bring the loading-unloading cell 15 above the airtight chamber 2 (as shown in dotted lines). The loading-unloading cell 15 is then laid onto the upper wall 6, in front of its passageway 7. Between cell 15 and airtight chamber 2 is positioned a valve 20 permitting to constitute an opening or an airtight closing between the loading-unloading cell 15 and the inner portion of airtight chamber 2.

When the loading-unloading cell 15 is thus positioned on the airtight chamber 2, it is sealingly fixed thereto. The inner portion of airtight chamber 2 is maintained under a vacuum by means of a first pumping device 100. When the loading-unloading cell 15 is thus coupled, a vacuum is created inside the cell by means of a second pumping device 200, then valve 20 is opened.

Inside airtight chamber 2, a device 21 permits a user to handle the parts to be treated and forms a lift. This handling means or lift 21 can rotate around the vertical axis and come in front of the loading-unloading cell 15. The lift 21 is then set to high position in order to bear the bottom of part 17 hitherto suspended inside the loading-unloading cell 15. The gripping means 19 is unlocked, the lift 21 is lowered and the part 17 is then introduced into the airtight chamber 2. The lift 21 is then rotated about axis 3 in order to be positioned in front of one of the treatment cells 10. In this position, the lift 21 is operated so as to cause the treatment part 17 to be raised and placed inside treatment cell 10. A gripping means 23 catches the upper projection 18 of part 17, so that the latter is suspended inside the treatment cell 10, as shown in FIG. 1. Treatment can then be carried out in cell 10.

When this treatment is completed, the lift 21 can then lift the part 17, bring it back to the airtight chamber 2, and then transfer it into another treatment cell for carrying out the next treatment. When part 17 has received all the desired treatments, it is brought back by the lift 21 into the loading-unloading cell 15 coupled to airtight chamber 2. Once the part 17 is suspended in cell 15 and lift 21 has gone down, it is then possible to close valve 20, to reestablish the atmospheric pressure in cell 15, to separate it from airtight chamber 2, and to bring cell 15 back by means of the T-support 11 onto an unloading area where the treated part 17 is laid down.

It can be seen that the loading-unloading cell 15 constitutes a means for handling part 17 to put it in a loading or unloading position and also forms an introduction room in the airtight chamber 2, thus preventing air from entering this chamber.

Figure 2:
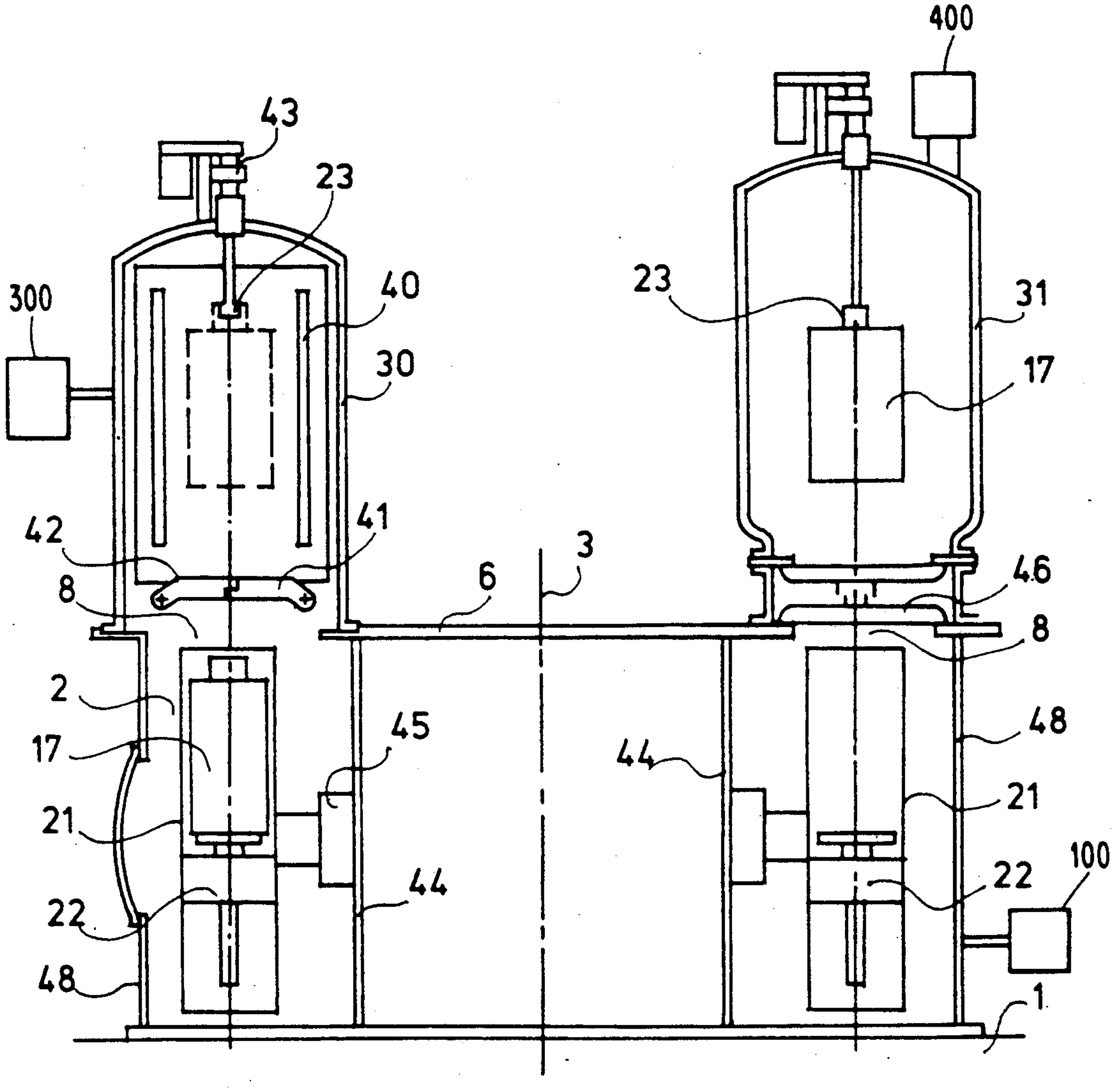
FIG. 2 is a simplified section view, at line A—A of FIG. 3, of a preferred embodiment of the invention.
Figure 3:
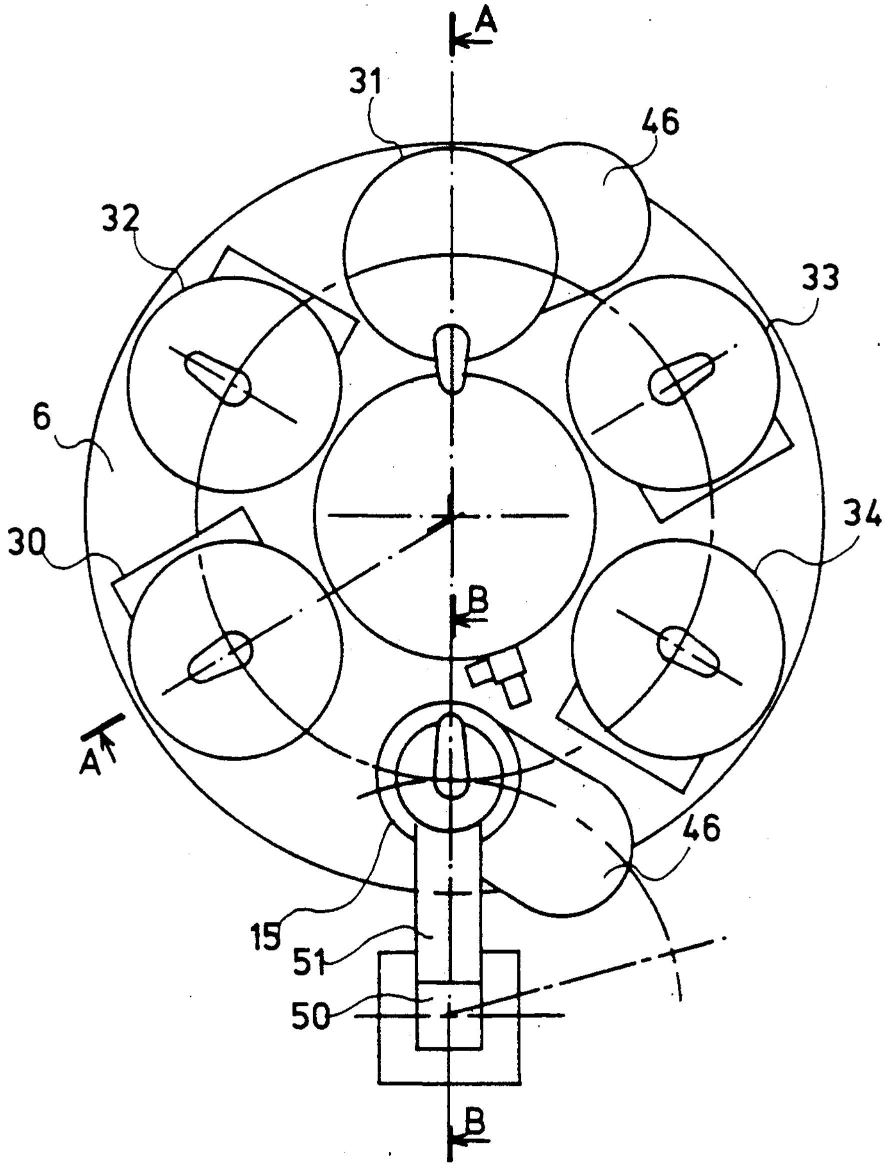
FIG. 3 is a simplified top view of the same embodiment of the invention per FIG. 2.
Figure 4:
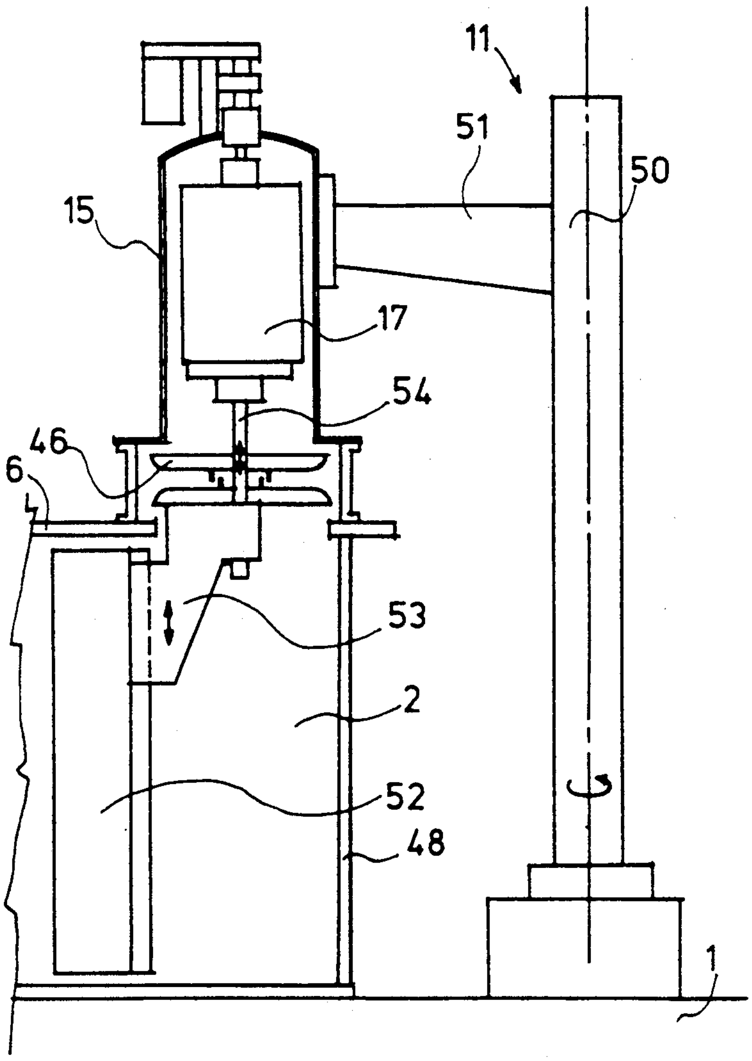
FIG. 4 is a simplified top view, at line B—B of FIG. 3, of a portion of the same embodiment of the invention.

Referring to FIGS. 2-4, an embodiment of the invention illustrating other features and advantages thereof will be described.

In FIGS. 2-4, the elements having the same functions as those shown in FIG. 1 are labelled the same.

FIG. 2 shows the airtight chamber 2 and two treatment cells 30 and 31. For the sake of legibility of the drawings, two treatment cells only have been shown. Indeed, as shown in FIG. 3, the device comprises five treatment cells 30, 31, 32, 33 and 34.

In FIG. 2, the treatment cell 30 is a cementation cell. It comprises means 40 for heating part 17 to a temperature of about 1000° C. A device 300 for introducing a cementation gas is provided at the periphery of cell 30. The cementation gas, which expands under a very low pressure, diffuses into the cell, enters the airtight chamber 2 and is evacuated by the pumping system 100 of the airtight chamber 2. Hinged elements 41, 42 form a thermal shield during cementation operation in order to prevent heat radiation from entering the airtight chamber 2 and increasing its temperature. Thermal shields 41, 42 do not close the aperture between cell 30 and airtight chamber 2, the cementation gas can then flow without impairment from cell 30 to chamber 2.

When the cementation operation is completed, the injection of cementation gas is closed and replaced by an injection of a neutral gas that purges the cell. Then, the thermal shields are retracted. The lift 21 is raised up to part 17 and a device 43 unblocks gripping means 23, thus releasing part 17 which is then lowered by lift 21 inside airtight chamber 2.

Inside airtight chamber 2, is arranged a cylindrically shaped wall 44 having a vertical axis 3 corresponding to the symmetry axis of chamber 2. This wall 44 has at its external periphery a guiding ring 46 allowing lift 21 to rotate around axis 3. The lift 21 can be moved in front of treatment cell 31.

Treatment cell 31 is used to carry out a hardening (gas-cooling) operation. Generally, a gas cooling is obtained with an inert gas under relatively high pressure, of about 2-5 bars. Consequently, in a treatment cell of this type, it is necessary to arrange between cell 31 and airtight chamber 2, a valve 40, or any other means for closing passage Before loading part 17 in the treatment cell 31, valve 46 is closed, a vacuum is created in cell 31 by means of a pumping device 400, then valve 46 is open and part 17 is introduced by means of lift 21 to be hooked by the gripping means 23. Then, valve 46 is closed again and the desired gas pressure is established, this gas being possibly circulated through a cold water heat sink and blown onto part 17 to obtain an increased hardening effect. The closing means can be constituted by a cap door which is pressed on the periphery of passage 8 arranged in the upper wall 6 of airtight chamber 2 by the difference in pressure on both sides. Since the closing means 46 has to open only when at least a partial vacuum has been created in treatment cell 31 and in airtight chamber 2, this opening or closing operation is easy owing to the low difference in pressure on both sides of the closing means.

Since the part is suspended inside a treatment cell, the treatment is facilitated as well as handling of the part.

The transfer of a part from a cementation cell 30 to a treatment cell 31 can be very quick if a vacuum has been created in the treatment cell 31 and valve 46 opened before transferring part 17.

Preferably, the passageway between a treatment cell and the airtight chamber is kept open in order to maintain a vacuum in the cell as often as possible, except, of course, when the cell has to contain gas for a predetermined treatment.

To optimize the utilization ratio of the various cells, it is possible to arrange a larger number of cells designed to carry out longer treatments. For example, as can be seen in FIG. 8, four cementation cells 30, 32, 33 and 34 are provided for one treatment cell 31. Indeed, the hardening time is much shorter than the cementation time. Also, several loading-unloading cells can be provided for simultaneously carrying out several loading or unloading operations of parts in the device.

To further increase the utilization ratio of the treatment device, several independent lifts 21 can be provided in the airtight chamber 2. Thus, several parts can be simultaneously moved into airtight chamber 2 in order to transfer them from one cell to another or to leave them in a stand-by position in the airtight chamber.

In the case of a generally cylindrical airtight chamber 2 such as shown in this exemplary embodiment, the volume of this airtight chamber can be limited to the space separating the inner cylindrical wall 44 from an external cylindrical wall 48. Then, the volume to be pumped is limited as well as the stresses due to atmospheric pressure. The inner cylindrical wall 44 serves, in that case, both to limit the volume of the chamber and to support the guiding ring 45 of one or several lifts 21.

Airtight chamber 2 has not necessarily a cylindrical shape. Any other shape can be devised. It is possible to provide, for example, an elongated airtight chamber and aligned cells. In that case, the lifts are able to linearly move in the airtight chamber to permit access to the various cells. If the airtight chamber encloses several lifts, a recess can be provided to accommodate one of the lifts while transferring a part across the airtight chamber by means of another lift.

FIG. 4 shows a T-support 11 designed to handle the loading-unloading cell 15. This T-support comprises a column 50 able to rotate around its axis and an arm 51 rigidly mounted on the column. Cell 15 is fixed to the extremity of an arm 51.

In FIG. 4, lift 21 is more clearly represented. It comprises a vertical sliding rail 52, a part 53 gliding along the sliding rail, driven by an engine, as well as a column 54 vertically gliding in part 53, also driven by an engine, and bearing part 17.

The device according to the invention is liable to be industrially used for carrying out series of continuous thermal treatments and can then be directly incorporated into manufacturing lines owing to its possible automation.

I claim

1. A device for treating parts under a controlled atmosphere, comprising:
   - an airtight chamber;
   - at least one treatment cell mounted on the airtight chamber and capable of communicating with the airtight chamber to a low a part to be transferred from the treatment cell to the airtight chamber;
   - at least one loading-unloading cell of a part formed with an aperture therein for enabling selective introduction and extraction of the part therethrough, each loading-unloading and treatment cell comprising means for gripping the part and keeping the part suspended therein;
   - means for handling the loading-unloading cell to move it from a remote loading-unloading position to a coupling position on the airtight chamber corresponding to the aperture of the loading-unloading cell, to allow the part to be transferred from the loading-unloading cell to the airtight chamber;
   - at least one transfer means for transferring the part from one of said loading-unloading and treatment cells to another of the same through the airtight chamber.

2. A device according to claim 1, wherein:
   - the airtight chamber comprises an upper substantially horizontal wall having a first and a second passageway formed therein;
   - each loading-unloading cell has its aperture downwardly directed and is fixed on the upper wall of the airtight chamber at said first passageway arranged in the upper wall; and
   - a closing means enables selective opening or closure of said first passageway between each loading-unloading cell and the inner part of the airtight chamber.

3. A device according to claim 2, wherein:
   - said at least one treatment cell has its aperture downwardly directed and is fixed on the upper wall of the airtight chamber at said second passageway arranged in the upper wall.

4. A device according to claim 1, wherein:
   - a first pumping means is provided to create a vacuum in said airtight chamber and a second pumping means is provided to create a vacuum in said at least one loading-unloading cell when the same is arrange don the airtight chamber for transferring of the part from said at least one loading-unloading cell to the airtight chamber.

5. A device according to claim 3, wherein:
   - said at least one treatment cell is formed to provide a thermal treatment at a low pressure and communicates with the airtight chamber during the treatment.

6. A device according to claim 5, further comprising:
   - a retractable thermal shield disposed in said second passageway between said at least one treatment cell and the airtight chamber.

7. A device according to claim 3, wherein:
   - said at least one treatment cell is formed to provide a treatment at a high pressure and so as to be isolated from the airtight chamber during said treatment by a means closing said second passageway.

8. A device according to claim 1, wherein:
   - said airtight chamber has a generally cylindrical shape having a vertical axis, a useful space therewithin being limited by an inner cylindrical wall and an external cylindrical wall having the same vertical axis, the inner cylindrical wall bearing a ring for guiding a motion of said at least one transfer means.

9. A device according to claim 1, wherein:
   - said airtight chamber has a generally elongated shape and each transfer means is linearly moved inside the airtight chamber by being selectively passed below said at least one loading-unloading treatment cell.

10. A device according to claim 1, wherein:
    - said transfer means comprises a lift associated with means for bringing said transfer means into selective correspondence with each of said loading-unloading and treatment cells.

* * * * *